US010585974B2

(12) United States Patent
Aoyama et al.

(10) Patent No.: US 10,585,974 B2
(45) Date of Patent: Mar. 10, 2020

(54) UI PRODUCING APPARATUS, UI PRODUCING METHOD, AND STORAGE MEDIUM (71) Applicant: HI CORPORATION, Shinjuku-ku, Tokyo (JP)

(72) Inventors: Tomonobu Aoyama, Tokyo (JP); Nobuyuki Hitsuji, Tokyo (JP); Tatsuo Sasaki, Tokyo (JP); Shin Ohhara, Tokyo (JP)

(73) Assignee: CANDERA JAPAN INC., Tokyo (JP)

( * ) Notice: Subject to any disclaimer, the term of this patent is extended or adjusted under 35 U.S.C. 154(b) by 253 days.

(21) Appl. No.: 15/388,019

(22) Filed: Dec. 22, 2016

(65) Prior Publication Data
US 2017/0185568 A1 Jun. 29, 2017

(30) Foreign Application Priority Data

Dec. 28, 2015 (JP) .................................. 2015-257063

(51) Int. Cl.
*G06F 3/14* (2006.01)
*G06F 17/21* (2006.01)
(Continued)

(52) U.S. Cl.
CPC .............. *G06F 17/212* (2013.01); *G06F 8/38* (2013.01); *G06F 9/44526* (2013.01);
(Continued)

(58) Field of Classification Search
CPC ..................................... G06F 3/14; G06F 3/17
(Continued)

(56) References Cited

U.S. PATENT DOCUMENTS 7,660,914 B2 * 2/2010 Perez .................... G06F 1/1613
710/15
2004/0015893 A1 1/2004 Banavar et al.
(Continued)

FOREIGN PATENT DOCUMENTS

JP 2010-134879 A 6/2010
JP 2012-073673 A 4/2012
(Continued)

OTHER PUBLICATIONS

Neil Desai; "WWDC 2015 Session 108 watchOS", Bulding Watch Apps, US, Apple Inc., Jun. 12, 2015, URL, https://developer.apple.com/videos/play/wwdc2015/108/ 16 pages.
(Continued)

*Primary Examiner* — Ruay Ho
(74) *Attorney, Agent, or Firm* — Ladas & Parry, LLP; Hermine Valizadeh (57) ABSTRACT To improve efficiency of UI production, a UI producing apparatus includes: a UI producing unit configured to allow a user to design UI screens which correspond to contents, respectively; a multi-preview executing unit configured to generate contexts for controlling the UI screens, respectively, and configured to simultaneously display previews corresponding to the UI screens, respectively, based on the contexts; a coordination unit configured to, responding to an event generated on at least one of the UI screens, provide a message, which includes information about the event, to one of the contexts corresponding to another one of the UI screens, in order to cause the UI screens to coordinate with each other; and a screen generating unit configured to modify the one of the contexts, based on the message, so as to generate the UI screens.

7 Claims, 8 Drawing Sheets (51) Int. Cl.
*G06F 9/451* (2018.01)
*G06F 8/38* (2018.01)
*G06F 9/455* (2018.01)
*G06F 9/445* (2018.01)
G06F 3/0488 (2013.01)
G06F 3/0484 (2013.01)

(52) U.S. Cl.
CPC .............. *G06F 9/451* (2018.02); *G06F 9/455* (2013.01); *G06F 3/0488* (2013.01); *G06F 3/04847* (2013.01)

(58) Field of Classification Search
USPC ........... 715/745, 762, 810; 345/619; 710/15; 717/108
See application file for complete search history.

(56) References Cited

U.S. PATENT DOCUMENTS

| | | | | |
|---|---|---|---|---|
| 2007/0168943 | A1* | 7/2007 | Marini | G06F 8/34 717/108 |
| 2008/0313199 | A1* | 12/2008 | Cho | H04N 1/00323 |
| 2014/0035945 | A1* | 2/2014 | Anglin | G06F 3/14 345/619 |
| 2014/0165000 | A1* | 6/2014 | Fleizach | H04M 19/04 715/810 |
| 2015/0074543 | A1* | 3/2015 | Edwin | G06F 3/0484 715/745 |

FOREIGN PATENT DOCUMENTS

| | | |
|---|---|---|
| JP | 2015-179481 A | 10/2015 |
| WO | 2008/031070 A2 | 3/2008 |

OTHER PUBLICATIONS

Hiroshi Matsuura et al; "Multimodal User-interface Editor for Multimodal Dialogue System", Technical Reports of Information Processing Society of Japan, Oct. 21, 1994, vol. 94. No. 90. pp. 37-42.

Japanese Office Action dated Apr. 19, 2016; Appln. No. 2015-257063.

Japanese Office Action dated Jun. 28, 2016; Appln. No. 2015-257063.

Naresh Babu M M, et al; "The open source cross-platform application development frameworks for smart phones", International Journal of Conceptions on Computing and Information Technology, vol. 1, No. 1, Nov. 2013, pp. 61-66, XP055365843, ISSN: 2345-9808 *p. 65, right-hand column, paragraph 1.

Extended European Search Report dated Apr. 28, 2017; Appln. No. 16206319.2-1072.

* cited by examiner

UI PRODUCING APPARATUS, UI PRODUCING METHOD, AND STORAGE MEDIUM

CROSS-REFERENCE TO RELATED APPLICATIONS

The present application claims the benefit of priority under 35 U.S.C. § 119 of Japanese Patent Application No. 2015-257063, filed Dec. 28, 2015, the contents of which are incorporated herein by reference in their entirety.

BACKGROUND OF THE INVENTION

1. Field of the Invention

The present disclosure relates to UI producing apparatuses, UI producing methods, and storage media.

2. Description of the Related Art

Conventionally, there have been user interfaces (UI) for manipulating various types of devices. Moreover, there have been mechanisms for performing synchronization control so as to display equivalent content on different UI screens (for example, see Japanese Patent No. 5258861, Japanese Patent No. 5217989, and Japanese Unexamined Patent Application Publication No. 2015-179481).

According to a method disclosed in Japanese Patent No. 5258861, in a case where a graphic user interface (GUI) screen displayed on a first-GUI displaying device is manipulated, second-GUI manipulating information is generated and then transmitted to a second-GUI displaying device which displays a GUI screen whose manipulating method, layout, and design differ from the GUI screen displayed on the first-GUI displaying device. The GUI screen displayed on the second-GUI displaying device is manipulated in synchronization with information displayed on the GUI screen displayed on the first-GUI displaying device.

Furthermore, according to a method disclosed in Japanese Patent No. 5217989, link information representing a link, which indicates a linkage of executions of objects, is stored. Further, the link information is updated based on an order of executing objects, which is indicated by relative positions of objects represented by visual information displayed on an edit area. Then, tentative executions of objects are performed, based on the updated link information, and results of the executions are displayed.

Furthermore, according to a method disclosed in Japanese Unexamined Patent Application Publication No. 2015-179481, compatibility of output information from different types of UI devices and input/output information of different types of software-designing tools is accomplished, utilizing the multiple software-designing tools which generate design information defining coordinated operations of different devices.

SUMMARY OF THE INVENTION

One aspect of the present invention provides a UI producing apparatus including: a UI producing unit configured to allow a user to design a plurality of UI screens which correspond to a plurality of contents, respectively; a multi-preview executing unit configured to generate a plurality of contexts for controlling the plurality of UI screens designed by use of the UI producing unit, respectively, and configured to simultaneously display a plurality of previews corresponding to the plurality of UI screens, respectively, based on the plurality of contexts; a coordination unit configured to, responding to an event generated on at least one of the plurality of UI screens corresponding to the plurality of previews displayed by the multi-preview executing unit, provide a message, which includes information about the event, to one of the plurality of contexts corresponding to another one of the plurality of UI screens, in order to cause the plurality of UI screens to coordinate with each other; and a screen generating unit configured to modify the one of the plurality of contexts, based on the message provided by the coordination unit, so as to generate the plurality of UI screens.

DESCRIPTION OF THE EMBODIMENTS

Even with such above-described background art, production of UIs intended for multiple display devices (e.g. multi-display) often involves difficulties, requiring repeated trial and error, because, for example, in a development environment of UIs, screens are displayed by different hardware (i.e. devices) provided as display devices in accordance with individual properties of the respective devices. Therefore, in such conventional methods, it has been difficult to determine a design in an early stage of producing multiple UIs which are intended to operate in a coordinated manner.

An object of the embodiment of the present embodiment is to improve efficiency of UI production.

According to the embodiment of the present invention, efficiency of UI production is improved.

In the following, details of the embodiment of the present invention will be described.

<Example of Functional Configuration of UI Producing Apparatus>

Figure 1:
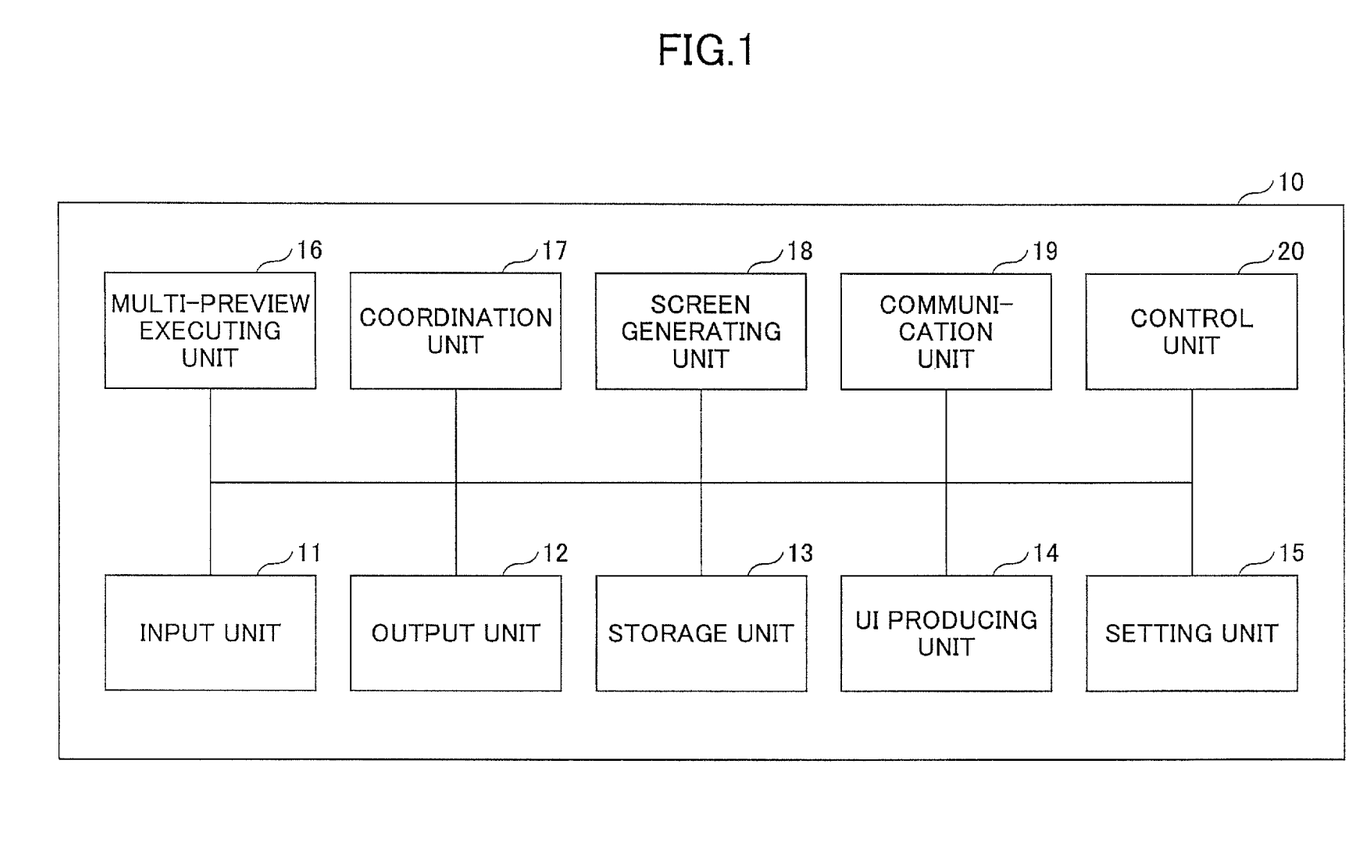
FIG. 1 is a drawing illustrating an example of a functional configuration of a UI producing apparatus, according to an embodiment of the present invention.

FIG. 1 is a drawing illustrating an example of a functional configuration of a UI producing apparatus 10, according to the embodiment of the present invention. As illustrated in FIG. 1, the UI producing apparatus 10 includes an input unit 11, an output unit 12, a storage unit 13, a UI producing unit 14, a setting unit 15, a multi-preview executing unit 16, a coordination unit 17, a screen generating unit 18, a communication unit 19, and a control unit 20.

The input unit 11 receives input of instructions for initiating/terminating various types of processes relating to UI producing processing according to the embodiment of the present invention and receives input of settings relating to the UI producing processing. For example, if assuming that the UI producing apparatus 10 is a general computer such as a personal computer (PC), the input unit 11 may be a pointing device such as a keyboard or a mouse. Furthermore, if assuming that the UI producing apparatus 10 is a tablet computer, a smartphone, etc., the input unit 11 may be a touchscreen, etc. Furthermore, the input unit 11 may be an audio-input device such as a microphone, which is capable of receiving such input based on sound, etc.

The output unit 12 outputs content that is input by the input unit 11, content obtained through a process executed based on the input content. The output unit 12 may be a display, a speaker, etc. The output unit 12 may be a touchscreen, which is integrated with the input unit 11. Furthermore, the output unit 12 may be a print device, such as a printer, which prints out a processing result, etc., on a print medium such as a paper.

The storage unit 13 stores various types of information necessary for the embodiment of the present invention. For example, the storage unit 13 stores programs, such as application and software, for executing the UI producing processing according to the embodiment of the present invention, various types of setting information, etc. Furthermore, the storage unit 13 may store an executing process, an executing result (i.e. history information), error information, user information, etc.

Here, the storage unit 13, which stores a collection of various types of information as described above, may have a function as a database which is systematically structured so as to search for and extract information by use of a keyword, etc. Furthermore, information stored in the storage unit 13 may be one that is acquired from an external device, etc., which is connected via a communication network such as the internet or a local area network (LAN).

The UI producing unit 14 produces multiple UI screens compatible with multiple types of content such as a video, an image, music, an email, a map, or a display of speed. According to the embodiment of the present invention, the storage unit 13 stores an integrated set of software for developing UIs. The UI producing unit 14 is capable of producing UIs intended for different devices, using the set of software. Furthermore, the UI producing unit 14 may produce UI screens, using multiple plug-ins.

Here, an intended device is one provided with a screen (i.e. display unit) for a user to operate or to refer to, such as a PC, a server, a tablet computer, a smartphone, or a wearable computer, although such an intended device is not limited to as mentioned and may include an automotive navigation system screen, an instrumental panel of a car, a display unit of a game machine, etc.

The setting unit 15 performs setting, through a setting dialog screen, etc., relating to processing regarding a multi-preview function intended for checking operations of multiple UIs. For example, the setting may include a setting regarding multiple UI contents subjected to synchronization control, a setting regarding a home screen, a setting regarding a received event, a setting regarding a context ID for identifying a context corresponding to each of the coordinated UIs, a setting regarding frames per second (FPS, or frame rate) relating to a display speed of previewing a UI, etc. Here, the context is information such as an internal state or a situation, conditions, etc., of a program. A UI screen is generated in accordance with the context, and then displayed on a display.

According to the embodiment of the present invention, the UI producing apparatus 10 is capable of generating and previewing multiple UIs intended respectively for multiple devices, based on the above-described setting information. Here, the setting is not limited to as mentioned, and may include a setting for authorizing eligibility for executing a multi-preview function in order to specify a user as a UI producer or a setting for creating a structure where, among multiple UI producers, only a selected UI producer is eligible for executing the multi-preview function.

The multi-preview executing unit 16 generates an individual context for previewing each of UI screens displaying preliminarily prepared multiple UI contents. In other words, the multi-preview executing unit 16 generates a context for simulating (i.e. controlling) each of the multiple UI screens in a preview. Here, although the multiple UI contents correspond to different devices, respectively, the multiple UI contents are not limited to as such. For example, the multiple UI contents may correspond to a single device and other devices.

Furthermore, the multi-preview executing unit 16 applies information as to UI content to a context, and then generates and displays a window for previewing each UI. In such a way, a synchronized operation of multiple UIs intended for different displays (i.e. devices) may be checked. Here, in the embodiment of the present invention, a window need not be generated for previewing each UI. Instead, multiple UIs may be previewed on a single window.

Furthermore, when an event is generated on a previewed UI screen through a user operation, (e.g. touching an icon on a screen), the multi-preview executing unit 16 issues a message (or an instruction) including event information and a destined context ID. Then, the multi-preview executing unit 16 transmits the issued message to a context designated by the context ID.

The coordination unit 17 provides a message including event information, which is generated on at least one UI screen of multiple UI screens displayed as previews by the multi-preview executing unit 16, for a context corresponding to another UI screen, so that the multiple UI screens coordinate with each other. For example, when a message is received and loaded on a context corresponding to an intended device, the coordination unit 17 causes a corresponding UI content to perform an operation, based on the received message. Then, a user may check UIs coordinating on different displays, as the operation is performed on a UI screen.

The screen generating unit 18 generates various types of screens in the embodiment of the present invention, and then displays the generated screens on the output unit 12. For example, the screen generating unit 18 modifies an existing context, based on event information included in a message provided by the coordination unit 17, in order to generate one or more UI screens.

Here, the screen generating unit 18 may generate a UI screen developed by the UI producing unit 14, a dialog screen for setting relating to a multi-preview function which is performed by the setting unit 15, a screen of multi-previewing which is performed by the multi-preview executing unit 16, a screen for a result of synchronization processing which is performed by the coordination unit 17, etc. Here, an example of a screen generated by the screen generating unit 18 is not limited to as such.

The communication unit 19 transmits and receives data to and from another device via a communication network such as the internet or a LAN. For example, via the communication unit 19, the UI producing apparatus 10 transmits to another device data stored in the storage unit 13, UI information (e.g. an executable program) for installing a UI produced by the UI producing unit 14 on an intended device, various types of setting information, etc. Furthermore, the UI producing apparatus 10 acquires various types of data stored in another device via the communication unit 19, and then stores the data in the storage unit 13.

The control unit 20 controls functions of constituent parts of the UI producing apparatus 10, etc. For example, the control unit 20 may control the UI producing unit 14 to execute processing concerning UI production, the setting unit 15 to execute processing concerning setting of information, the multi-preview executing unit 16 to execute processing concerning a multi-preview screen, the coordination unit 17 to execute processing concerning various types of coordination, the screen generating unit 18 to execute processing concerning generation of a screen, and the communication unit 19 to execute processing concerning data transmission.

Furthermore, the control unit 20 may execute processing concerning initiation and termination of a process, processing in the event of an error, etc. Further, an example of a function controlled by the control unit 20 is not limited to as such.

The UI producing apparatus 10 may be, but not limited to, a PC, a server, etc. For example, the UI producing apparatus 10 may be a cloud server constituted by cloud computing of one or more information processing apparatuses.

<Example of Hardware Configuration of the UI Producing Apparatus>

Figure 2:
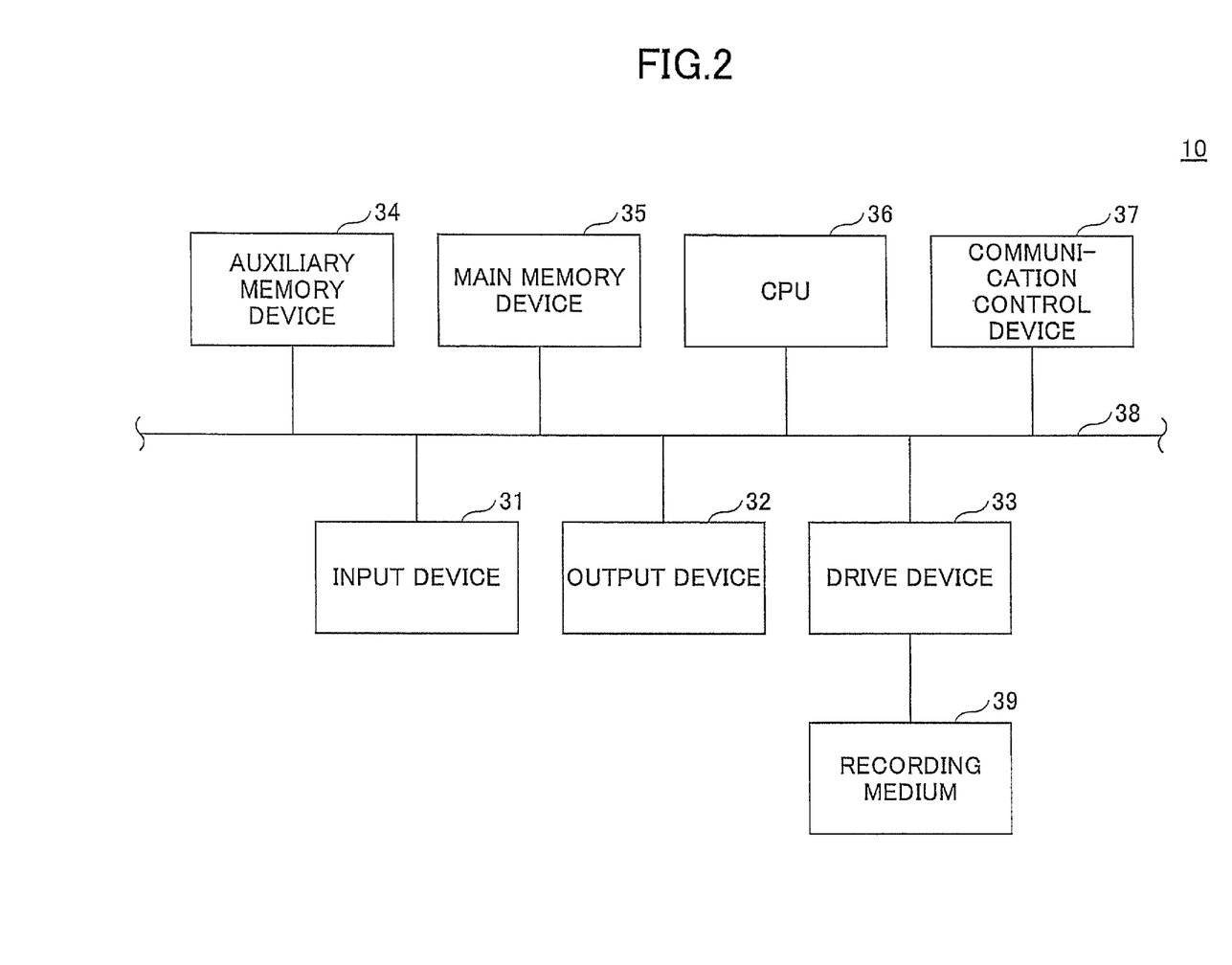
FIG. 2 is a drawing illustrating an example of a hardware configuration of the UI producing apparatus, according to the embodiment of the present invention.

In the following, an example of the hardware configuration of the UI producing apparatus 10 will be described, with reference to FIG. 2. FIG. 2 is a drawing illustrating an example of the hardware configuration of the UI producing apparatus 10, according to the embodiment of the present invention. As illustrated in the example of FIG. 2, the UI producing apparatus 10 (e.g. computer) includes an input device 31, an output device 32, a drive device 33, an auxiliary memory device 34, a main memory device 35, a central processing unit (CPU) 36, and a communication control device 37, which are interconnected via a bus 38.

The input device 31 may include a pointing device for a user to operate such as a keyboard and mouse, an audio input device such as a microphone, and an operation device such as a controller, so as to receive input, from a user, etc., of, for example, instructions for executing a program, various types of operation information, information for running software, etc.

The output device 32 includes a display, etc., for displaying a window, data, etc., for manipulating a computer (i.e. UI producing apparatus 10) to execute processing according to the embodiment of the present invention. The output device 32 is capable of displaying an executing process, an executing result, etc., based on a control program provided for the CPU 36.

Here, according to the embodiment of the present invention, an executable program which is installed on the computer may be provided from a recording medium 39, etc. The recording medium 39 may be provided on the drive device 33. In accordance with a control signal from the CPU 36, the executable program stored in the recording medium 39 may be installed to the auxiliary memory device 34 from the recording medium 39 through the drive device 33.

The auxiliary memory device 34 may be a storage unit, etc., such as a hard disk drive (HDD) or a solid state drive (SSD). The auxiliary memory device 34 stores an executable program (i.e. UI producing program) according to the embodiment of the present invention, a control program provided on the computer, etc., in accordance with a control signal from the CPU 36, and accepts input and output as needed. The auxiliary memory device 34 accepts read and write of necessary information, based on the control signal, etc., from the CPU 36.

The main memory device 35 stores an executable program, etc., which is retrieved from the auxiliary memory device 34 by the CPU 36. The main memory device 35 may be a read only memory (ROM), a random access memory (RAM), etc.

The CPU 36 controls overall processing of the computer, including various types of calculation, input and output of data to/from respective hardware items, etc., in accordance with a control program such as an operating system (OS) or an executable program stored in the main memory device 35, in order to enable each process. Information needed for an execution of a program may be acquired from the auxiliary memory device 34, and executing results, etc., may be stored.

Specifically, the CPU 36 executes a program installed on the auxiliary memory device 34, responding to an instruction for executing the program acquired from the input device 31, etc., in order to execute processing corresponding to the program on the main memory device 35. For example, by executing the UI producing program, the CPU 36 controls the UI producing unit 14 for producing an UI, the setting unit 15 for performing information setting, the multi-preview executing unit 16 for controlling a multi-preview screen, the coordination unit 17 for controlling various coordination, the screen generating unit 18 for generating a screen, the communication unit 19 for transmission/reception of various types of data, etc. An example of the processing performed by the CPU 36 is not limited to as such. Information as to an execution performed by the CPU 36 may be stored in the auxiliary memory device 34, etc., as needed.

The communication control device 37 performs communication with another external device, via a communication network as described above. The communication control device 37 connects to the communication network, etc., in order to acquire an executable program, software, setting information, etc., from an external device, etc., in accordance with a control signal from the CPU 36. Furthermore, the communication control device 37 may transmit an executing result, which is obtained through execution of a program, to an external device, etc., and may transmit an executable program itself according to the embodiment of the present invention to an external device, etc.

The recording medium 39 is a computer-readable storage medium that stores an executable program, etc., as described above. The recording medium 39 may be, but need not be limited to, a semiconductor memory such as a flash memory, a portable recording medium such as a CD-ROM or a DVD, etc.

Installation of an executable program, such as the UI producing program, on the hardware configuration as illustrated in FIG. 2 enables the hardware items and software to function in cooperation with each other, to execute various kinds of information processing such as UI production according to the embodiment of the present invention.

<UI Producing Processing>

Figure 3:
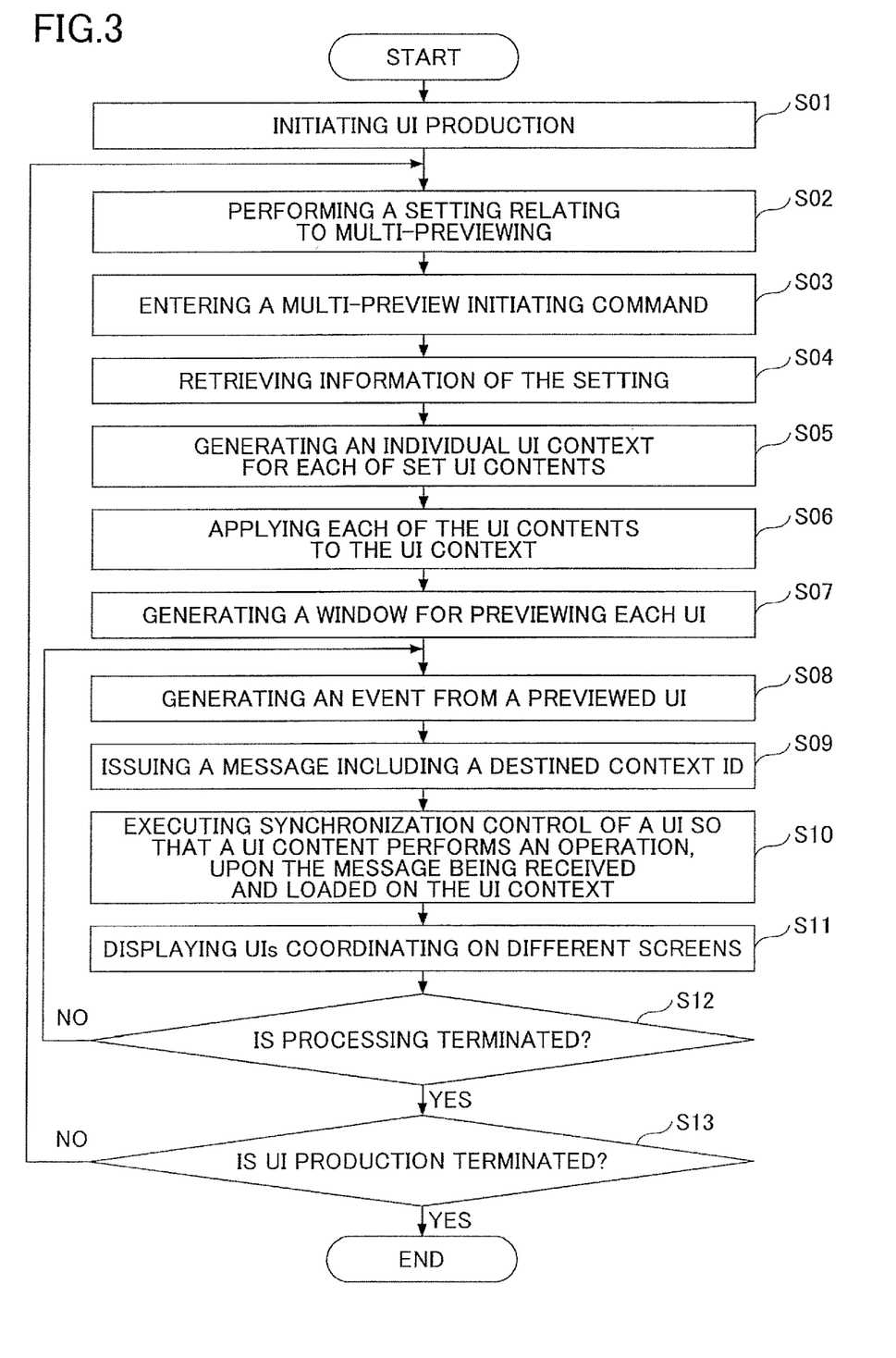
FIG. 3 is a flowchart illustrating an example of UI producing processing, according to the embodiment of the present invention.

In the following, an example of UI producing processing according to the embodiment of the present invention will be explained, with reference to a flowchart. FIG. 3 is a flowchart illustrating an example of the UI producing processing according to the embodiment of the present invention. According to the example in FIG. 3, a UI production is initiated on the UI producing apparatus 10 (S01). A user performs a setting relating to a multi-preview function (S02). At the step S02, a setting of multiple UI contents, a setting regarding a home screen, a setting regarding a received event, a setting regarding a context ID, a setting regarding FPS, etc., may be performed, although an example of the setting is not limited to as such. Setting information regarding such settings is stored in the storage unit 13.

Subsequently, when a multi-preview initiating command is entered (S03), the multi-preview executing unit 16 retrieves the setting information stored in the storage unit 13 (S04), and then generates an individual UI context for each of set UI contents (S05). Furthermore, the multi-preview executing unit 16 applies each of the UI contents to the generated UI context (S06), so as to generate a window for previewing each UI (07).

Furthermore, upon user instruction, etc., the multi-preview executing unit 16 generates an event regarding a previewed screen (S08), and then issues a message including a destined context ID (S09).

Then, when the message is received and loaded on the UI context corresponding to a coordinating device, the coordination unit 17 performs processing of synchronization control of UIs, so that UI content performs an operation on a generated window for previewing a UI. In such a way, UIs that operate on different windows in a coordinated manner are displayed on the screen (S11).

Then, based on a user instruction, etc., the control unit 20 determines whether to terminate the processing of synchronization control with the multi-preview function (S12). In a case of not terminating the processing (NO at S12), the processing returns to the step S08. In a case of terminating the processing (YES at S12), the control unit 20 determines whether to terminate the UI producing processing, based on a user instruction, etc., (S13). In a case of not terminating the UI producing processing (NO at S13), the processing returns to the step S02. In a case of terminating the UI producing processing (YES at S13), the control unit 20 terminates the UI producing processing.

GUI Production According to the Embodiment of the Present Invention>

Figure 4:
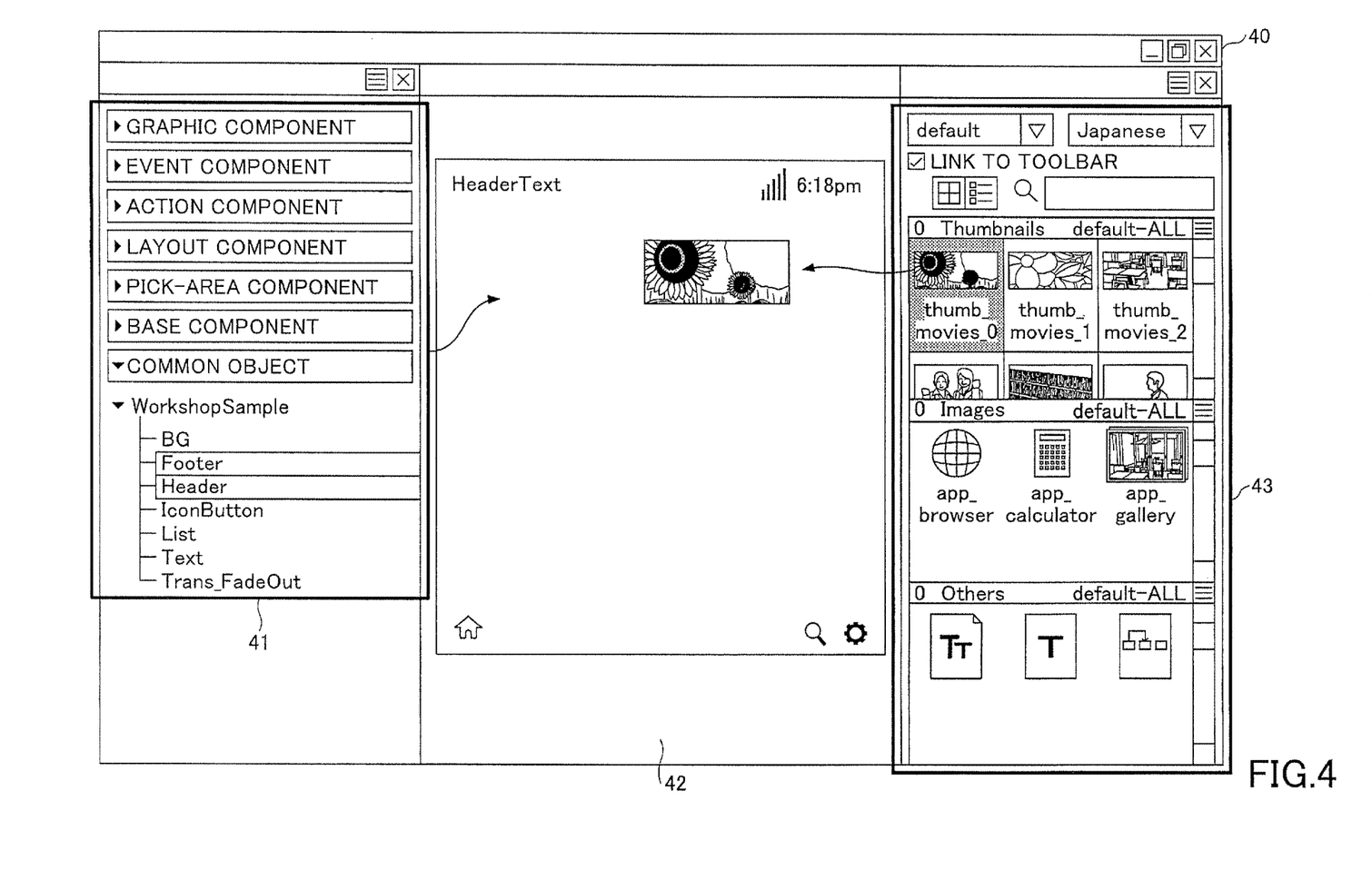
FIG. 4 is a drawing illustrating an example of a UI producing screen, according to the embodiment of the present invention.

In the following, a specific example of the UI production according to the embodiment of the present invention will be explained, with reference to FIG. 4. FIG. 4 is a drawing illustrating an example of a UI producing screen 40 according to the embodiment of the present invention. In the example of FIG. 4, the UI producing screen 40 displayed on the output unit 12 provided on the UI producing apparatus 10 is illustrated.

The UI producing screen 40 is a screen generated by the screen generating unit 18. The UI producing screen 40 includes a component setting area 41, a UI displaying area 42, and a tool area 43.

The component setting area 41 performs settings regarding components, actions, objects, etc., related to a UI being produced. The components may include, but not be limited to, a graphic component, an event component, an action component for executing processing corresponding to an event, a layout component for generating a layout, an pick-area (i.e. area selection) component for performing a setting regarding an area on the screen, a base component for performing a setting regarding a basic configuration, etc. Furthermore, a UI screen being produced is displayed on the UI displaying area 42. For example, the UI producing unit 14 functions for moving an item included in the component setting area 41 or icon information included in the tool area 43 to the UI displaying area 42 upon a user instruction, through a drag and drop operation, etc., so as to produce a UI screen.

In the tool area 43, a list of various types of tools corresponding to respective icons for executing files and software is displayed. The UI producing unit 14 functions for moving a selected tool to the UI displaying area 42 upon a user instruction, so as to produce a UI screen. Tools may include, but not be limited to, a movie, music, an image, a web browser, a text file, etc. Such tools enable various kinds of processing, as exemplified by a function for designing a UI, a function for performing a setting regarding conversation function on a UI, a function for generating an animation, a function for performing a setting regarding screen shift, a function for displaying a preview screen, a function for performing a setting regarding connection to a database, a function for performing a setting regarding localization, a function for outputting a document, etc.

According to the embodiment of the present invention, a highly productive user friendly tool with respect to UI production may be provided, as illustrated in FIG. 4. Further, according to the embodiment of the present invention, even a person without a special knowledge may easily produce a UI screen, as a UI is generated through drag and drop operations.

Figure 5:
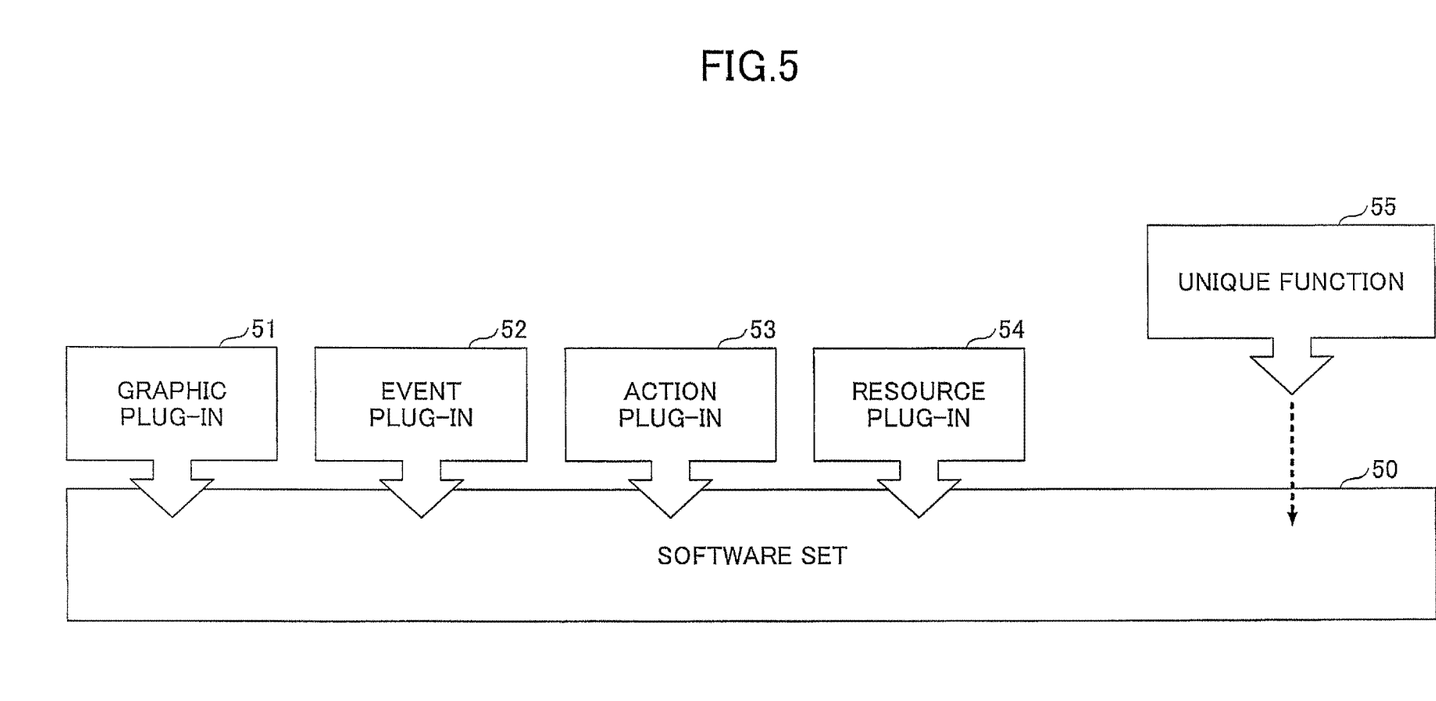
FIG. 5 is a drawing illustrating an example of a plug-in architecture, according to the embodiment of the present invention.

Here, according to the embodiment of the present invention, a plug-in architecture is employed for producing a UI. FIG. 5 is a drawing illustrating an example of the plug-in architecture according to the embodiment of the present invention. As illustrated in FIG. 5, the UI producing unit 14 may add, to a basic software set 50 for producing a UI, a graphic plug-in 51 (e.g. for displaying a text, displaying a screen, drawing a rectangle or an ellipse, etc.), an event plug-in 52 (e.g. for a touch input function, a key input function, a timer setting function, etc.), an action plug-in 53 for a function relating to an action responding to operation of a button on the screen, etc., a resource plug-in 54 for a resource setting function, etc. Furthermore, according to the embodiment of the present invention, a unique function 55 provided for each device, etc., may be added as a plug-in. In such a way, a plug-in may be added as a tool or a runtime, for utilizing additional functions, and therefore high expandability may be provided.

<Coordination Unit>

Figure 6:
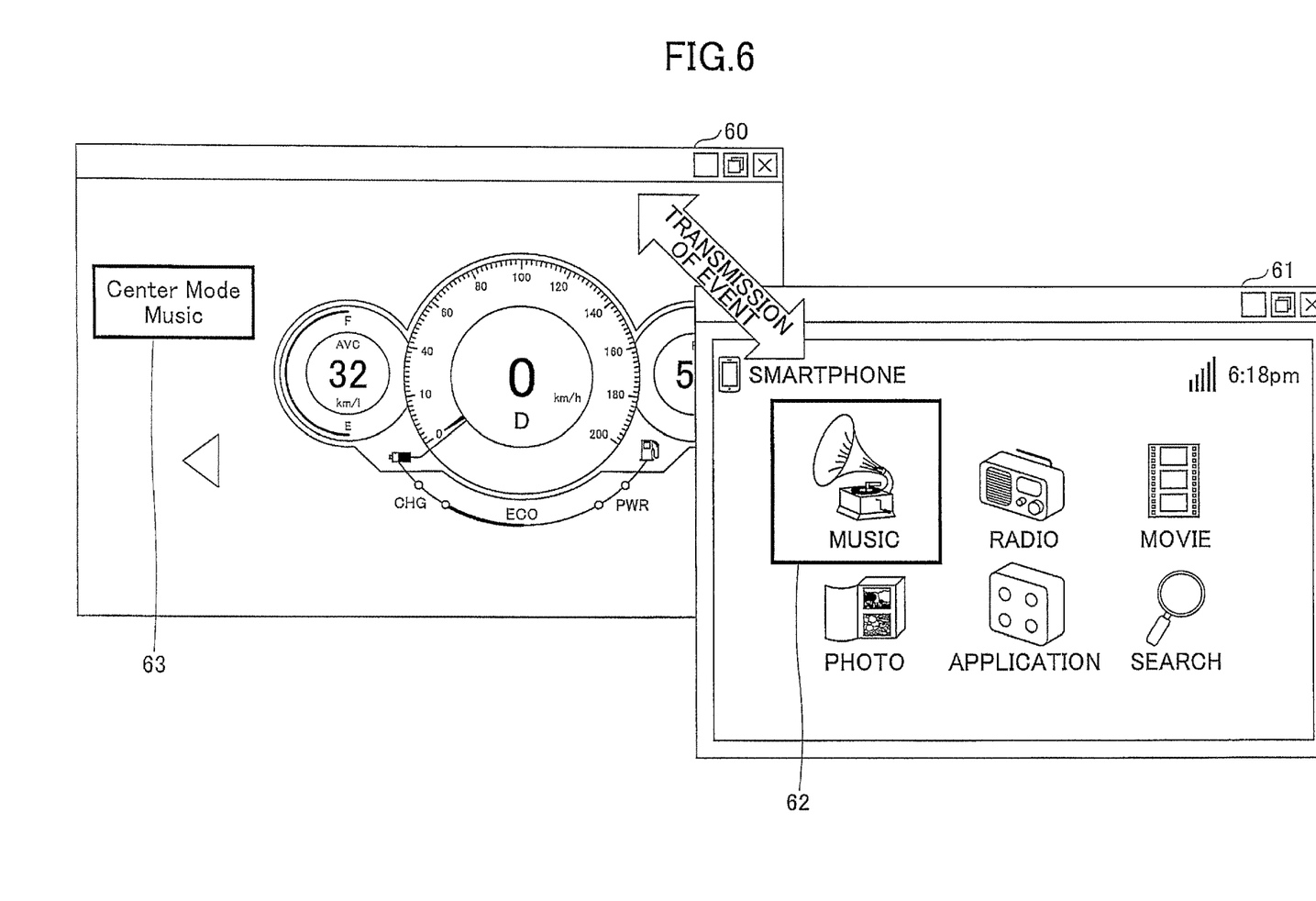
FIG. 6 is a drawing illustrating an example of a multi-preview screen, according to the embodiment of the present invention.

In the following, processing performed by the above-described coordination unit 17 will be explained, with reference to FIG. 6 as an example of a multi-preview screen. FIG. 6 is a drawing illustrating the example of the multi-preview screen according to the embodiment of the present invention. Here, in the example of FIG. 6, an instruction panel screen 60 for a car and a content selecting screen 61 for a smartphone are illustrated as an example of multiple UI contents operating in a coordinated manner. The instruction panel screen 60 and the content selecting screen 61 are both UI screens (e.g. GUI screens) produced by the UI producing unit 14. The UI screens are intended for devices operating in a coordinated manner.

For example, as illustrated in FIG. 6, when an icon 62 for running a music tool (i.e. application) is selected among multiple icons on the content selecting screen 61, the screen of the smartphone is switched to a screen for playing music.

At the same time, an event is transmitted between two screens, so as to cause the instruction panel screen 60 to indicate in a coordination displaying area 63 that the smartphone is running an application for playing music.

Here, the number of screens for multi-previewing is not limited to two, and synchronization control may be performed on three or more screens. Furthermore, although a single preview screen is displayed on a single window in the example of FIG. 6, the number of preview screens displayed on a window is not limited to one. That is to say, multiple preview screens may be displayed on a single window.

In such a way, according to the embodiment of the present invention, UIs that coordinate on different display screens of multiple devices may be generated and previewed in a development stage. Here, prototypes even for testing coordinated operations of UI screens may be produced in an early development stage, and therefore definitive models may be determined in an early stage and costs for development may be reduced.

Here, in the embodiment of the present invention, the multi-preview executing unit 16 may be provided with a function for setting a maximum rate of FPS in accordance with capability of an intended device for displaying a screen and a function for displaying FPS.

Figure 7:
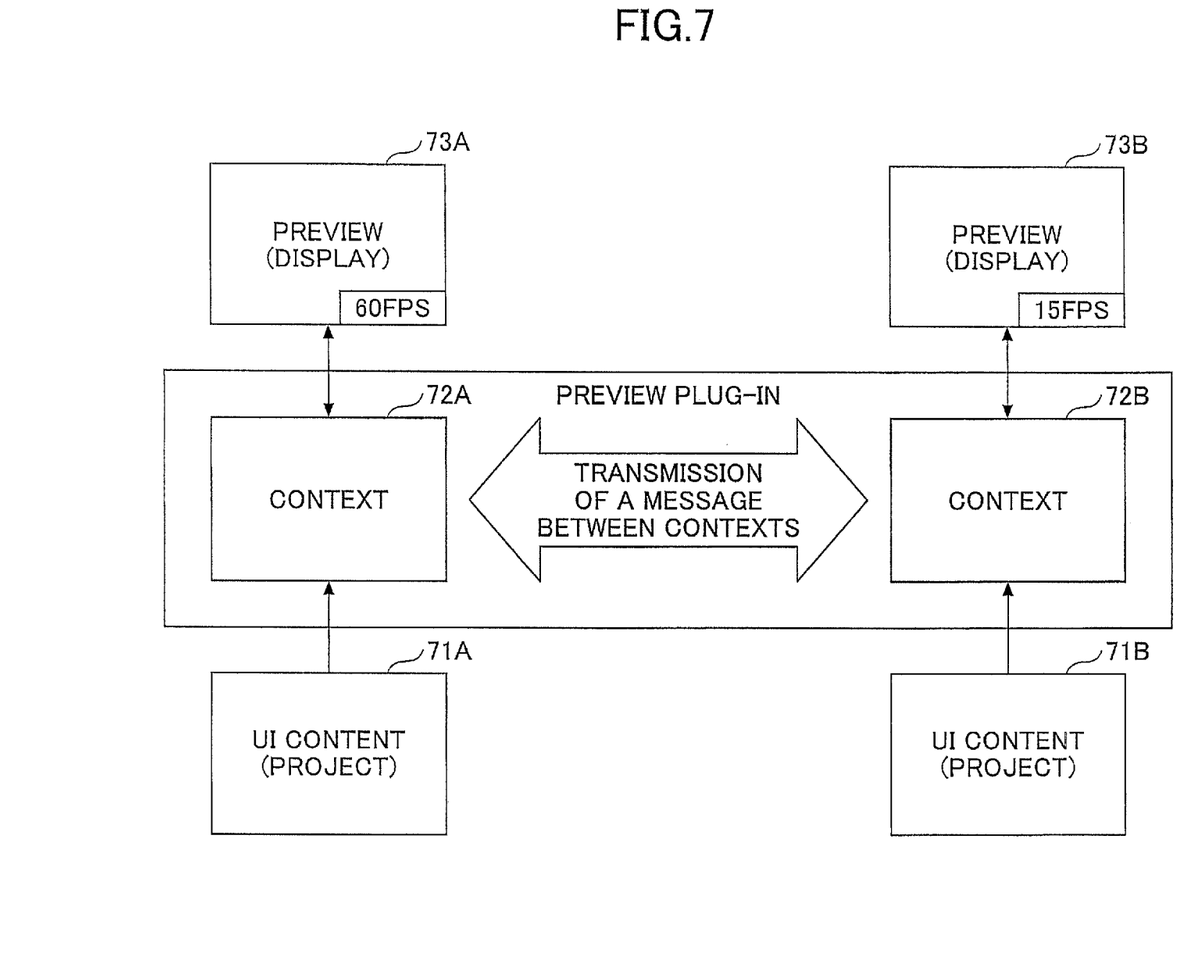
FIG. 7 is a drawing for explaining coordination on different UI screens, according to the embodiment of the present invention.

FIG. 7 is a drawing for explaining coordination on different UI screens. In the embodiment of the present invention, two UI contents 71A and 71B are loaded on individual contexts 72A and 72B, respectively, so that previews (i.e. preview screens) 73A and 73B of UIs are displayed at the same time on multiple displays. As a message is transmitted between the contexts 72A and 72B and the transmitted message is reflected on the screens displayed on the displays, a user may check coordination on different screens in a development stage.

Here, the setting unit 15 may set different FPS for previewing each of UIs in accordance with a corresponding device, so that graphic qualities of different devices may be accurately simulated on a single terminal device such as a computer. Although the FPSs for previewing UI screens are displayed on the previews 73A and 73B, respectively, information displayed on the previews 73A and 73B is not limited to as such. Here, processing according to FIG. 7 is a simulation of previewing UIs, and therefore a communication method (i.e. protocol, etc.) employed for actual devices may be determined apart from the above-described method that utilizes transmission of a message.

Furthermore, although a coordinated operation caused on generated screens is described in the embodiment of the present invention with respect to the UI producing unit 14, a coordinated operation caused by input information obtained from an external device (i.e. an external apparatus) may be checked.

Figure 8:
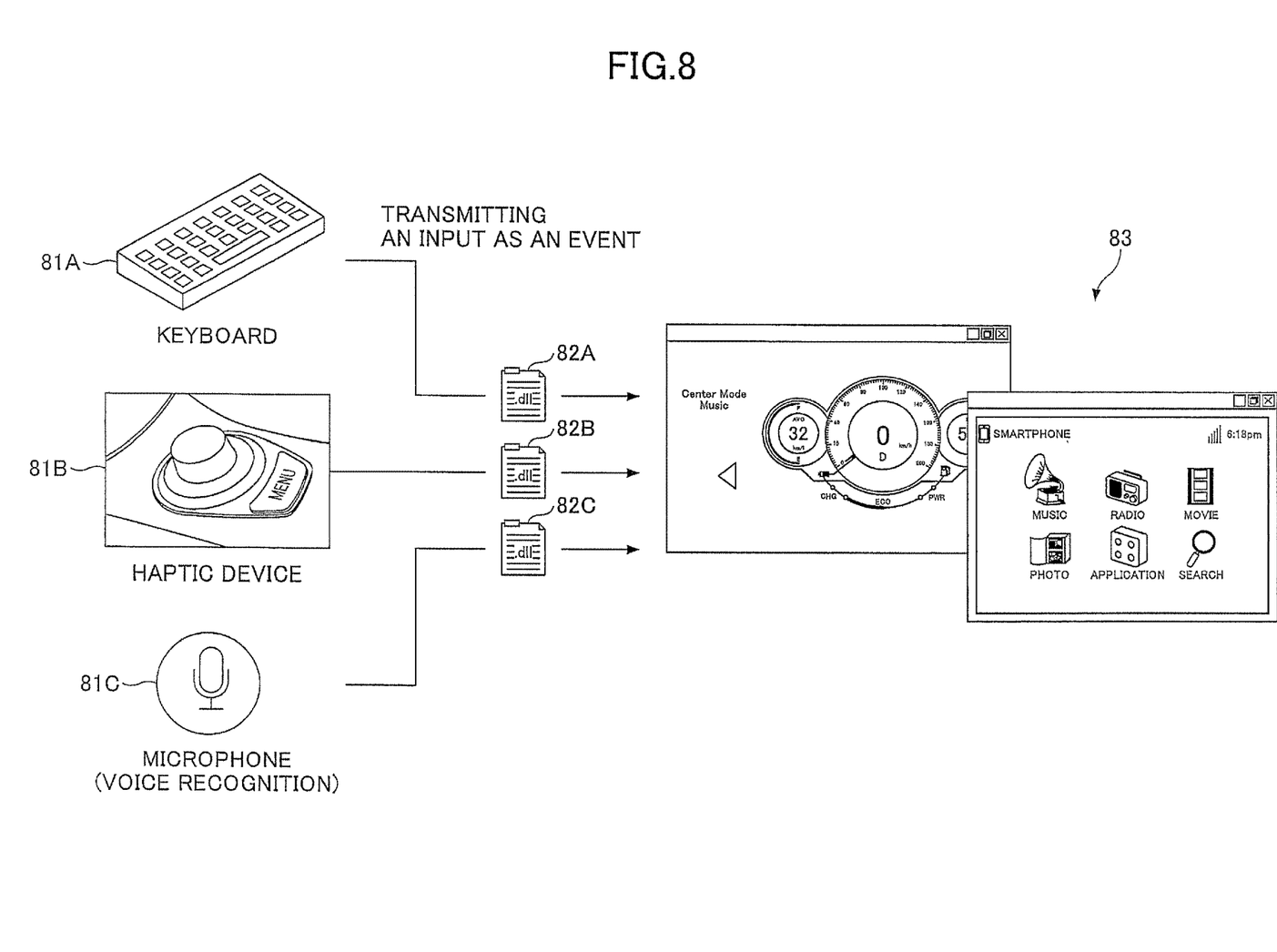
FIG. 8 is a drawing illustrating an example of a coordinated operation by use of input information entered by external devices, according to the embodiment of the present invention.

FIG. 8 is a drawing illustrating an example of a coordinated operation by use of input information entered by external devices. In the example of FIG. 8, input from external devices 81A through 81C are transmitted as events, whereas plug-ins 82A through 82C are provided as tools for processing such events for performing previews. Here, in the example of FIG. 8, plug-ins for processing reception of events from external devices may be provided. The coordination unit 17 may receive such events and executes processing corresponding to the received events, respectively, so as to enable coordination (i.e. synchronization control) of different screens on a multi-preview screen 83 as illustrated in FIG. 8.

<Specific Examples of the Embodiment of the Present Invention>

The UI producing processing according to the above-described embodiment of the present invention enables rapid development of UIs, with which an automotive navigation system screen of a car, an instruction panel screen of the car, and a mobile terminal (e.g. a smartphone) of a person on the car operate in a coordinated manner, with respect to displayed contents.

Furthermore, in the field of game machines such as an arcade game at a game center or a pachinko, etc., the UI producing processing according to the above-described embodiment of the present invention enables production of UIs, with which an individual screen (i.e. main screen) provided on a game machine for a player to play the game and a screen provided at the game center for multiple people to watch displayed content of the individual screen operate in a coordinated manner.

Furthermore, in the field of medical systems, etc., the UI producing processing according to the above-described embodiment of the present invention enables production of UIs, with which an individual screen of a device that is accessible to personal information of patients, a screen of a tablet computer carried by a doctor or a nurse as an electronic medical chart to input information concerning patients on-site, and a screen of an integrated management device for managing information data on a real-time basis may operate in a coordinated manner, so as to coordinate information of a patient.

As described above, efficiency of UI production may be improved, according to the embodiment of the present invention. For example, according to the embodiment of the present invention, authoring (i.e. production) of UIs for multiple display devices (e.g. multi-display) may be possible. Further, although production of UIs that operate in a coordinated manner on multiple different screens is described in the embodiment of the present invention, the embodiment of the present invention may be applied to production of a UI having multiple functions coordinating on a single screen.

Further, the present invention is not limited to these embodiments, but various variations and modifications may be made without departing from the scope of the present invention.

What is claimed is:

1. A user interface (UI) producing apparatus comprising:
 a UI producing unit configured to allow a user to design a plurality of UI screens which correspond to a plurality of contents, respectively;
 a multi-preview executing unit configured to generate a plurality of contexts for simulating the plurality of UI screens designed by using the UI producing unit, respectively, configured to apply the plurality of contents to the plurality of contexts to generate the plurality of UI screens, respectively, each of the plurality of contexts including one or more of an internal state, a situation, and conditions of a program for previewing a corresponding one of the plurality of UI screens, and configured to simultaneously display a plurality of previews corresponding to the plurality of UI screens, respectively, based on the plurality of contexts;
 a coordination unit configured to provide, in response to an event generated on a first UI screen selected from the plurality of UI screens corresponding to the plurality of previews displayed by the multi-preview executing unit, a message including event information about the event to one of the plurality of contexts corresponding to each of one or more second UI screens selected from among the plurality of UI screens, and configured to perform processing of synchronization control of the first UI screen and each of the second UI screens based on the message, to coordinate with each other by causing each of the second UI screens to indicate in a coordination displaying area the occurrence of the event on the first UI screen; and a screen generating unit configured to modify the one of the plurality of contexts, based on the message provided by the coordination unit, to generate the plurality of UI screens.

2. The UI producing apparatus according to claim 1, wherein the plurality of contents correspond to a plurality of devices, respectively.

3. The UI producing apparatus according to claim 1, wherein the UI producing unit allows the user to design the plurality of UI screens by use of a plurality of connected plug-ins.

4. The UI producing apparatus according to claim 1, wherein the multi-preview executing unit displays each of the plurality of previews, in accordance with a frame rate provided for each of the plurality of UI screens.

5. The UI producing apparatus according to claim 1, wherein the coordination unit generates the information of an event, based on an input from an external device, and provides the message including the information about the event to one of the plurality of contexts corresponding to the plurality of UI screens, in order to cause the plurality of UI screens to coordinate with each other.

6. A non-transitory computer readable storage medium storing a program causing a computer to enable a function of each unit comprised by the UI producing apparatus according to claim 1.

7. A UI producing method executed by a processor of a UI producing apparatus, the method comprising:

allowing a user to design a plurality of UI screens corresponding to a plurality of contents, respectively;

generating a plurality of contexts for simulating the plurality of UI screens, respectively;

applying the plurality of contents to the plurality of contexts to generate the plurality of UI screens, respectively, each of the plurality of contexts including one or more of an internal state, a situation, and conditions of a program for previewing a corresponding one of the plurality of UI screens;

simultaneously displaying a plurality of previews corresponding to the plurality of UI screens, respectively, based on the plurality of contexts;

in response to an event generated on a first UI screen selected from among the plurality of UI screens corresponding to the plurality of previews, providing a message including event information about the event to one of the plurality of contexts corresponding to each of one or more second UI screens selected from among the plurality of UI screens;

performing processing of synchronization control of the first UI screen and search of the second UI screens based on the message, to coordinate with each other by causing each of the second UI screens to indicate in a coordination displaying area the occurrence of the event on the first UI screen; and modifying the one of the plurality of contexts based on the provided message, to generate the plurality of UI screens.

* * * * *